United States Patent
Dadheech et al.

(10) Patent No.: US 9,344,340 B2
(45) Date of Patent: May 17, 2016

(54) SYSTEM AND METHOD FOR NOTIFICATION OF QOE ISSUES

(71) Applicant: International Business Machines Corporation, Armonk, NY (US)

(72) Inventors: Himanshu Dadheech, Waterford (IE); Jonathan Dunne, Dungarvan (IE); Paul B. French, Cork (IE); James P. Galvin, Jr., Georgetown, KY (US); Patrick J. O'Sullivan, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 14/082,462

(22) Filed: Nov. 18, 2013

(65) Prior Publication Data
US 2015/0138994 A1    May 21, 2015

(51) Int. Cl.
*H04L 12/26* (2006.01)
*H04L 12/24* (2006.01)

(52) U.S. Cl.
CPC ........ *H04L 41/5067* (2013.01); *H04L 41/5025* (2013.01)

(58) Field of Classification Search
CPC ............ H04L 41/5006; H04L 41/5009; H04L 41/5025; H04L 41/5067; H04L 43/065; H04L 43/08; H04L 43/0829; H04L 43/087; H04L 43/0882; H04L 43/16
See application file for complete search history.

(56) References Cited

U.S. PATENT DOCUMENTS

| | | | |
|---|---|---|---|
| 9,071,677 B2 * | 6/2015 | Aggarwal | H04M 3/2227 |
| 2008/0084969 A1 | 4/2008 | Moore | |
| 2009/0225670 A1 * | 9/2009 | Leung | H04L 41/022 370/252 |
| 2010/0046631 A1 | 2/2010 | Raveendran | |
| 2011/0019570 A1 * | 1/2011 | Leung | H04L 41/5009 370/252 |
| 2012/0151009 A1 * | 6/2012 | Bouazizi | H04L 41/5067 709/219 |
| 2012/0226736 A1 | 9/2012 | Falchuk et al. | |
| 2013/0166731 A1 | 6/2013 | Yamanaka et al. | |
| 2013/0219048 A1 * | 8/2013 | Arvidsson | H04L 41/5025 709/224 |
| 2013/0286868 A1 * | 10/2013 | Oyman | H04W 24/06 370/252 |
| 2014/0310564 A1 * | 10/2014 | Mallige | G06F 11/3051 714/47.1 |
| 2015/0135246 A1 * | 5/2015 | Dunne | H04N 17/004 725/109 |

OTHER PUBLICATIONS

Garcia, et al., "A QoE Management System for Ubiquitous IPTV Devices", 2009 Third International Conference on Mobile Ubiquitous Computing, Systems, Services and Technologies, pp. 147-152, 978-0-7695-3834-1/09 $26.00 © 2009 IEEE, DOI 10.1109/UBICOMM.2009.31.

Singh, et al., "Predictive Buffering for Streaming Video in 3G Networks", 978-1-4673-1239-4/12$31.00, © 2012 IEEE.

(Continued)

*Primary Examiner* — Ahmed Elallam
(74) *Attorney, Agent, or Firm* — Edward P. Li (57) ABSTRACT

A computer-implemented method, computer program product, and computer system for notification of a QoE (Quality of Experience) issue in a network service. An end user device sends the notification to a server providing the network service, in response to determining that calculated QoE metrics is below a predetermined level for a predetermined time period. The server resolves the QoE issue, in response to determining that the QoE issue is listed to be resolved by the server. The server forwards the notification of the QoE issue to a system administrator, in response to determining that the QoE issue is not listed to be resolved by the server.

18 Claims, 4 Drawing Sheets

(56) References Cited

OTHER PUBLICATIONS

IBM, "Method for Assuring Quality of Experience in an IP Communications System", An IP.com Prior Art Database Technical Disclosure, Authors et. al.: Motorola, Inc., Keller, Matthew, Newberg, Donald, Original Publication Date: Aug. 26, 2008, IP.com No. IPCOM000174108D, IP.com Electronic Publication: Aug. 26, 2008, Copyright: © 2008 Motorola, Inc.

IBM, "Improving User Experience by Moving Video Rendering Into the Cloud", An IP.com Prior Art Database Technical Disclosure, Authors et. al.: David Sainte-Claire, IP.com No. IPCOM000195992D, IP.com Electronic Publication: May 24, 2010, Copyright: 2010, Sony Electronics Inc.

* cited by examiner

SYSTEM AND METHOD FOR NOTIFICATION OF QOE ISSUES

FIELD OF THE INVENTION

The present invention relates generally to network services, and more particularly to notification of QoE (Quality of Experience) issues in network services.

BACKGROUND

With the advent of broadband networks and high end video encoding methods, video applications have dominated the digital world. There are varied applications available in the market to facilitate ease, entertainment, and flexibility to users. The varied applications include, but are not limited to, IPTV (Internet Protocol Television), Web conferencing, video calling, and multimedia messaging. These services promise greater user satisfaction in terms of high QoE (Quality of Experience) for end users. QoE is a better metric than QoS (Quality of Service) in encapsulating user perceived quality of any services and thus helps service providers improve their services by providing precise measurement of user satisfaction. These services are not only facilitating but also demanding in terms of high end infrastructure, precisely orchestrated technology, and sufficient resources to deliver quality services and user perceived QoE.

One drawback of the highly demanding nature of these video applications is their dynamic behavior in performance and dependence of their quality of services on the current network resources and conditions. The current network resources and conditions keep on fluctuating depending on different physical and virtual parameters. This dynamic nature produces service problems or issues, including deferred transmission in IPTV, blurred images in TV and web based video calling systems, discontinuity in telecast or transmission, and transmission of damaged frames or video sequences. These problems or issues severely impact the QoE, and users have to contact their service providers to rectify the errors. These problems or issues not only hamper the user experience with video, but is also annoying because users themselves have to contact service providers physically for each of the problems or issues.

Different scenarios and conditions may lead to these problems or issues. For example, in an IPTV system, the users have to report online or via phone any connection problems they have with their subscriptions; in a Web conferencing system of an enterprise, a company has to contact the vendor for any technical glitches in performance of audio/video telephony; in an Internet service provider system, the users have to report and then wait for optimal bandwidth allocation to their connection for video application usage.

While these problems or issues cause discomfort in terms of reporting, the physical feedback loop involving a human interface takes much more time to resolve the problems or issues by taking appropriate remedial actions. Sometimes, the delays in services may range from hours to days. Occasional or periodic feedback inquiry from service providers is unable to cure the problems or issues because of two reasons: (1) involved user interaction is cumbersome for end users and (2) the time slot is too big to capture the instantaneous fluctuations in the network services.

SUMMARY

Embodiments of the present invention provide a computer-implemented method, a computer program product, and a computer system for notification of a QoE (Quality of Experience) issue in a network service. An end user device gathers statistics of the network service. The end user device computes QoE metrics based on the statistics of the network service. The end user device determines whether the QoE metrics is below a predetermined level for a predetermined time period. In response to determining that the QoE metrics is below the predetermined level for the predetermined time period, the end user device sends the notification of the QoE issue to a server which provides the network service. In response to receiving the notification of the QoE issue, the server determines whether the QoE issue is listed to be resolved by the server. The server resolves the QoE issue, in response to determining that the QoE issue is listed to be resolved by the server. The server forwards the notification of the QoE issue to a system administrator, in response to determining that the QoE issue is not listed to be resolved by the server.

DETAILED DESCRIPTION

The dynamic nature of the performance of the network services demands a consistent feedback loop to the service providers, in order to maintain the promised quality of experience (QoE) for the users or to take any rectifying action in case of a crisis situation. The feedback loop keeps the service providers aware of the current network situation, as well as the quality of data or the service delivered at the endpoint system. For assurance of promised QoE to users, and for the comfort and full satisfaction of users, there is need of a feedback system which is consistent, real time, and independent of user interaction. The QoE notification to the servers for performing remedial actions to take care of user perceived QoE is the key solution to the issues. This will enable the system and the servers to check and perform any necessary actions required to maintain the services.

If there is an automated QoE notification from a user end device to a server, a remedial action can be taken immediately in case of any QoE issues. For example, if there is a QoE issue with an IPTV subscriber and the issue hampers the user experience, then the set-top box itself may compute the QoE at the user end and feed it back to the server, and now the server tries to sort the root of the problem and take a necessary action to resolve the issue. This will prevent the user discomfort of calling the service provider, and the problem could be resolved even before the user has realized the issue.

Automated QoE notification from the end user device to the server and then the immediate remedial action taken by the server are the key to resolve the QoE issues in nearly all video applications. This autonomous independent feedback and reaction loop will not only provide wide user satisfaction, but also help the service provider maintain their own system, prevent any case of system failure, and predict any future issues and data/service usage patterns related to performance of the current system. The prediction helps the service provider upgrade and renovate the current infrastructure.

Embodiments of the present invention disclose an autonomous QoE notification system within a video application to facilitate the immediate and effective corrective system for enhancement of user experience and prevention of a user interface in the feedback and reaction process. Such notification feedback surface in real time and is kept up to date in real time for allowing the service provider to identify the patterns of service issues related to malfunctioning of resources and to perform predictive remedial actions proactively.

The system and the method calculate QoE without interrupting the users and send it to the server in case of degradation only. This feature adds a level of sophistication to the notification, as it includes the estimated user experience in the error message. Also, the embodiments of the present invention account for the level of risk assessment of the notified issue and work for each level of the issues in a different approach, such as, by a server, by a system administrator, or by a door-to-door service.

The system and the method disclosed in the embodiments generate an automated QoE notification system which can estimate QoE for a video application and trigger a feedback loop to a server and a system administrator to fix the service issues as soon as possible without intervention of the end user. The server then performs a remedial action based on the nature of the issue. The benefit here is rather than having to phone a service provider to resolve the issues. An end user device communicates directly with the system administrator via the server.

The system and the method provide a wider scope of the ability for a client application (for example, Web Conference or PC Audio call) to transmit QoE issues in real time back to the server. The data transmitted is then aggregated to allow service providers to infer QoE with either a wider audience or a given cohort. Then, the patterns over time are observed. These patterns can be used to augment server behavior over time.

The system and the method provide an additional enhancement. Deciding to compute and send the QoE to the service provider is based on the determination that someone is actually looking at the screen. This could be determined by current art such as cameras, etc. This would aid scalability and performance of such a solution.

Quality of varied video applications serviced online (such as Web conferencing and video calling) or via dedicated links (such as IPTV) relies on the resources allocated to users, channel conditions, and proper functioning of each link which acts as a backbone for transmission of data from one end to other. Quality of service as perceived by the user can be measured in different terms and parameters like delay, packet loss, resolution, voice, and video synchronization, etc. One or more of these parameters are interdependent and play a key role in defining the limits of acceptable quality as perceived by users. QoE is a major metric for assessing the quality of service as perceived by the user, which conglomerates various network and physical parameters. The key part is not only to provide good quality of service to users, but also to maintain it and keep measuring the QoE time to time for quality assurance and consistency in user satisfaction. If this measurement involves end user interaction, then it becomes a quality degradation issue again. Thus, the need of assuring perfect QoE for subscribers at all times in all locations leads not only to optimizing use of the physical resources, but also to taking an automated feedback from the end user device, assessing the QoE, predicting the risk of falling below the promised standard of quality, and performing any remedial actions, if required, immediately. This automated QoE notification from the end user device back to the service provider assures at least the timely feedback of any discrepancy in the functionality of system, and adequate actions can be taken logically by the server or by the system administrator without letting users be aware of the changes in the system.

In an example of a generic scenario, the end user as a subscriber of IPTV has ordered a video on demand and plans to watch movie at home with family and friends. The weather conditions are not favorable for high definition transmissions and can cause disturbance in the image quality. A set-top box at the end user device continues to keeps on measuring network parameters, such as like delay, jitter, packet loss, and bandwidth supplied, and calculates QoE metric based on the E-Model for audio and the Opinion-Model for video. Both E-Model and Opinion-Model are standardized by ITU-T (Telecommunication Standardization Sector of the International Telecommunications Union). The set-top box then informs the server whenever the current QoE drops below a certain promised level for a fixed duration in real-time. The server in turn reflects the remedial action to be taken to the set-top box if the issue is listed to be resolved by the server itself, such as, lowering the frame-rate, bit-rate or resolution, or changing the codec without producing any alert for the system administrator. If the issue is severe enough that it cannot be handled autonomously by the server, then the server generates an alert for the system administrator. At the administrator side, the risk level of the issue is predicted and the issue is classified as "urgent", "moderate", or "to-do". The system administrator keeps on monitoring the issues involving risk level with "urgent" on priority, such as link failure, set-top box malfunctioning, or failure of a subsystem, and then the system administrator performs the remedial actions accordingly. This automated notification of QoE keeps the users away from the feedback loop and thus reduces end user discomfort. This automated notification of QoE resolves the issues quickly, and also enables the service provider to resolve the most frequent issues for all users and form a pattern of problems associated with each user, locality, and region. The same procedure applies to other video applications with slight variation in the technology and infrastructure used.

The advantages of using QoE notification within video applications are as follows. (1) The end users are totally out of the feedback loop of any issue related to QoE, which adds on to a next level of service quality by the service provider. (2) The issue is reported to the administrator as soon as it happens, thus saving the time to report the incident. Using QoE notification enables both the service provider and users to report each issue related to quality and to resolve those issues quickly. (3) The service provider is always updated about the functionality of each subsystem and thus is able to increase the service quality by upgrading the subsystems for future use and to form a pattern of issues in space and time dimensions. (4) Using QoE notification provides an automated technique for monitoring adherence to any QoE Service Level Agreements that might be in effect.

Embodiments of the present invention will now be described in detail with reference to the accompanying drawings.

Figure 1:
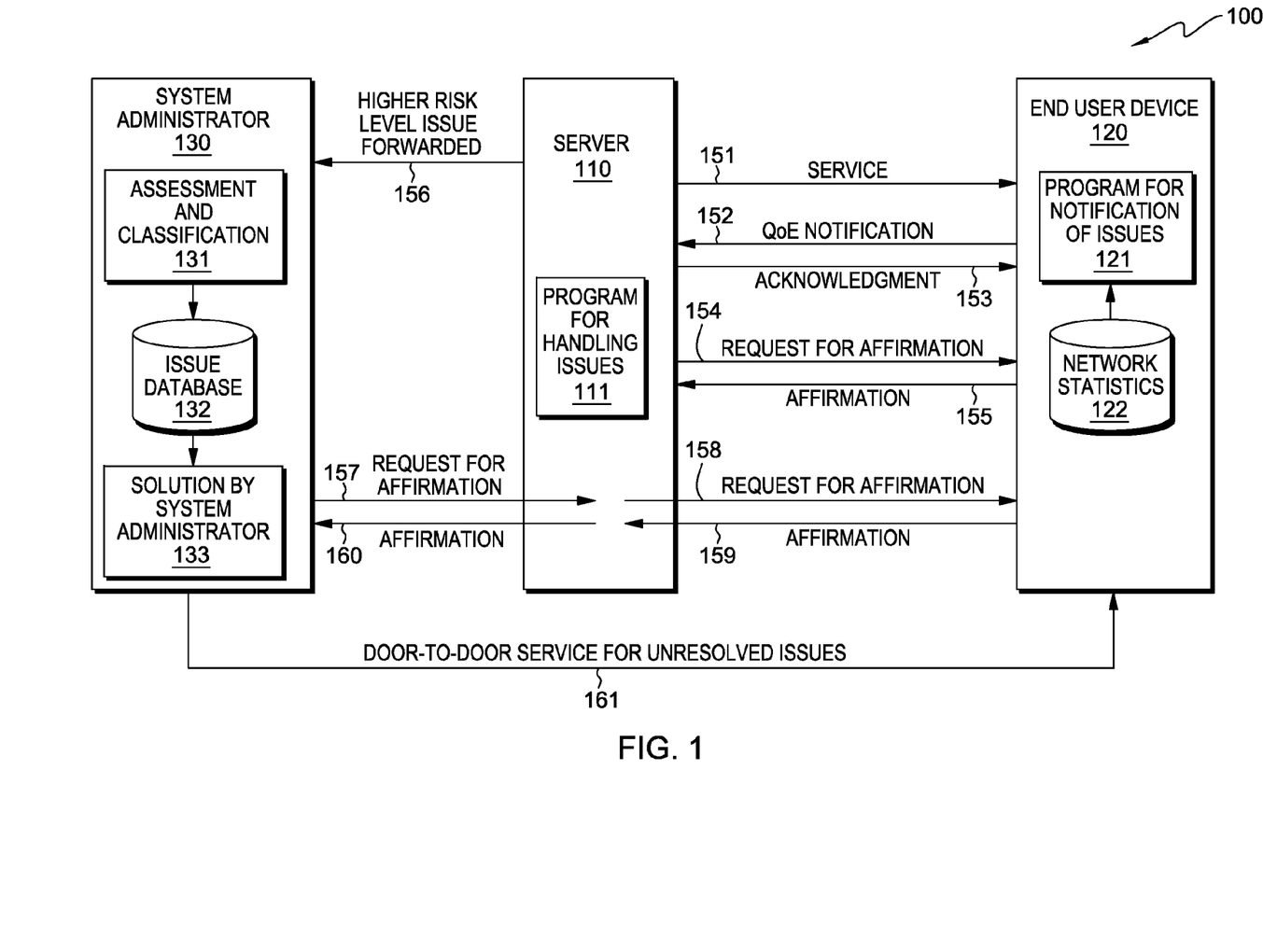
FIG. 1 is a diagram illustrating a system for notification of QoE issues, in accordance with one embodiment of the present invention.

FIG. 1 is a diagram illustrating system 100 for notification of QoE issues, in accordance with one embodiment of the present invention. System 100 comprises server 110, end user device 120, and system administrator 130. Server 110, used by a service provider, provides a service such as IPTV (Internet Protocol Television), Web conferencing, video calling, or multimedia messaging. Server 110 provides the service to a user using end user device 120, as shown by numeral 151. End user device 120 is a computer device, any device receiving audio and/or video signals, or a set-top box. On end user device 120, program 121 for notification of issues keeps on monitoring the network and gathering statistics such as delay, jitter, packet loss, and bandwidth. The statistics are stored onto network statistics 122. In the embodiment shown in FIG. 1, network statistics 122 is on end user device 120, such as memory of a computer device. In other embodiments, network statistics 122 may be separated from end user device 120.

In the embodiment shown in FIG. 1, on end user device 120, program 121 for notification of issues calculates QoE based on the statistics. In other embodiments, program 121 for notification of issues may be on a computing device attached or connected to end user device 120. When calculated QoE is below a predetermined level for a predetermined period of time, program 121 for notification of issues sends QoE notification to server 110 to report an issue of the service. In FIG. 1, sending the QoE notification from end user device 120 to server 110 is indicated by numeral 152. In response to receiving the QoE notification, on server 110, program 111 for handling issues sends an acknowledgement to end user device 120, which is indicated by numeral 153 in FIG. 1.

On server 110, program 111 for handling issues determines whether the issue is listed to be resolved by the server itself. If program 111 for handling issues determines that the issue is to be resolved by the server itself, program 111 for handling issues resolves the issue. In responding to resolving the issue, program 111 for handling issues sends a request for an affirmation to end user device 120, which is indicated by numeral 154 in FIG. 1. Program 121 on end user device 120 sends the affirmation, as indicated by numeral 155 shown in FIG. 1. If program 111 on server 110 determines that the issue is not listed to be resolved by the server itself, program 111 sends the issue as a higher risk level issue to system administrator 130, which is indicated by numeral 156 in FIG. 1.

As shown by block 131 in FIG. 1, in response to receiving the higher risk level issue, system administrator 130 assesses the risk level involved with the issue and classifies the issue as, for example, "urgent", "moderate", or "to-do". System administrator 130 monitors all the listed issues in issue database 132 and resolves them according to the sequence: priority to "urgent", then "moderate", and then "to-do". If a solution to the issue is provided instantly, system administrator 130 provides the solution (as shown by block 133). In response to providing the solution, system administrator 130 sends a request (indicated by numeral 157) to server 110 for an affirmation of server 110. In response to receiving the request sent by system administrator 130, program 111 on server 110 sends a request (indicated by numeral 158) to end user device 120 for an affirmation of end user device 120. In response to receiving the request sent by program 111 on server 110, program 121 on end user device 120 sends (indicated by numeral 159) the affirmation of end user device 120. In response to receiving the affirmation from program 121 on end user device 120, program 111 on server 110 sends (indicated by numeral 160) to system administrator 130 the affirmation of server 110. If a solution to the issue can not be provided instantly, system administrator 130 takes the issue in concern and tries to develop a solution as soon as possible. The solution may involve a human interaction and a door-to-door service (indicated by numeral 161).

Figure 2A:
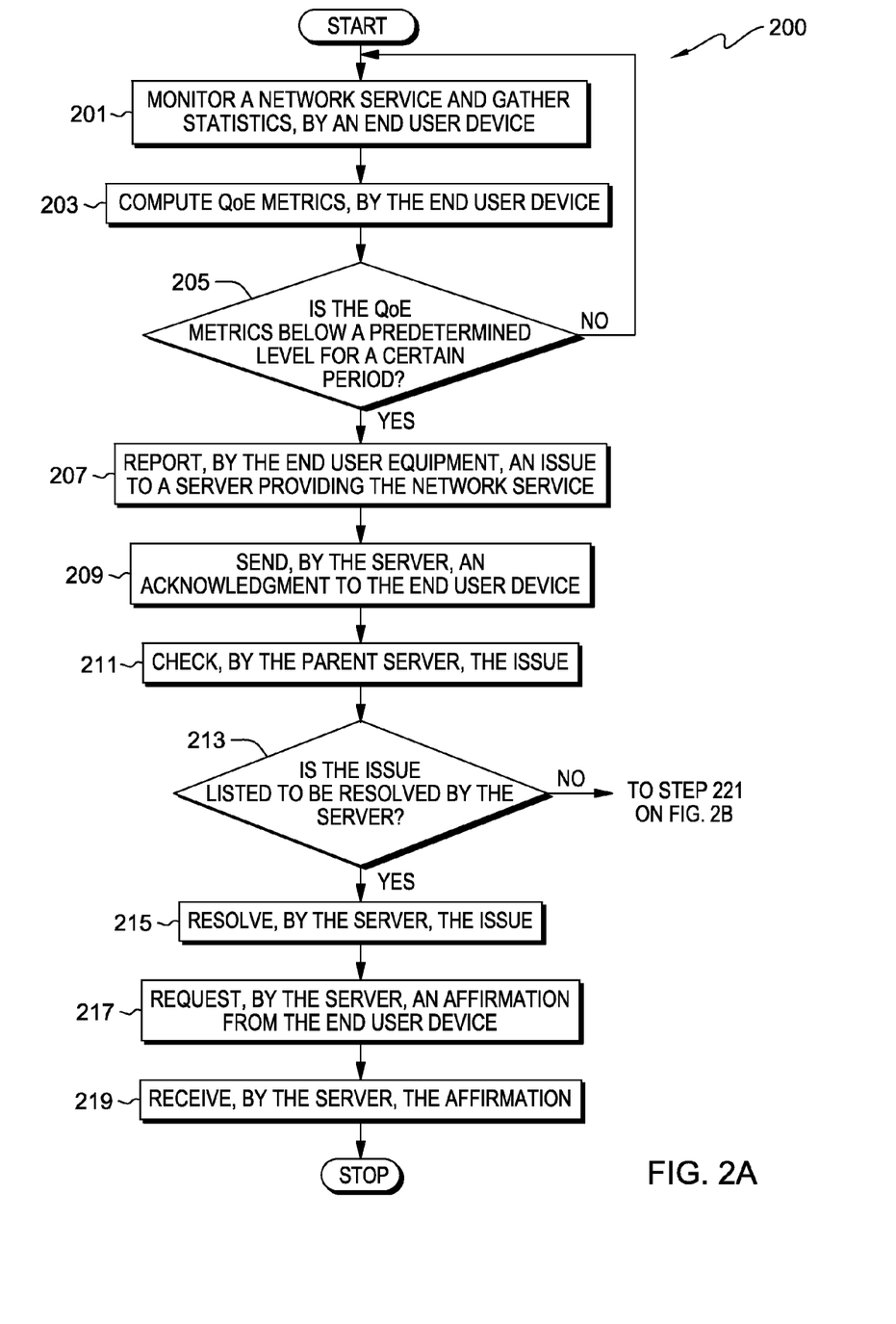
FIGS. 2A and 2B present a flowchart illustrating operating steps of notification of QoE, in accordance with one embodiment of the present invention.
Figure 2B:
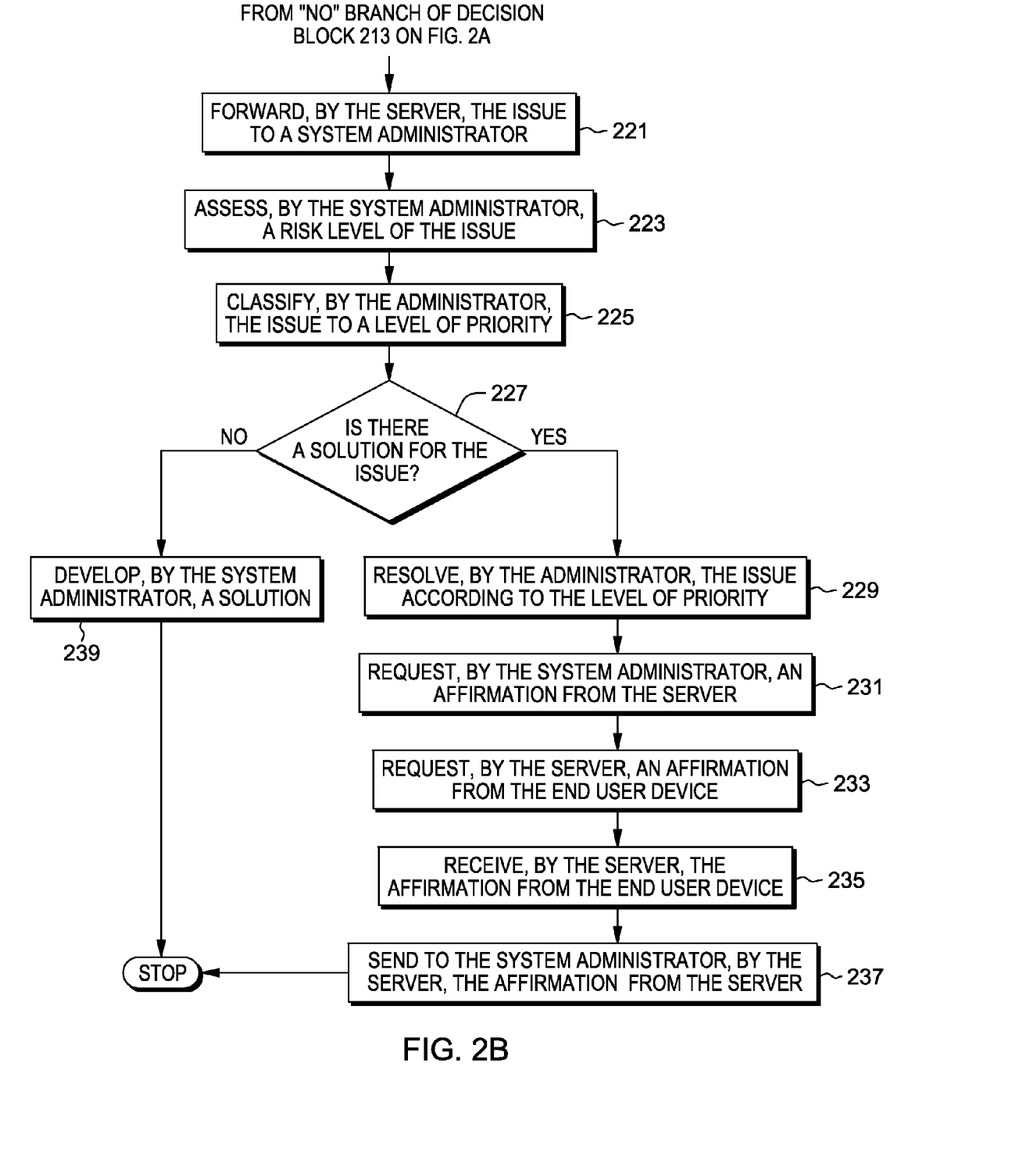

FIGS. 2A and 2B present flowchart 200 illustrating operating steps of notification of QoE, in accordance with one embodiment of the present invention. Referring to FIG. 2A, at step 201, on end user device 120 (shown in FIG. 1), program 121 (shown in FIG. 1) for notification of issues monitors a network service and gathers statistics of the network service. For example, the statistics include delay, jitter, packet loss, and bandwidth. At step 203, program 121 for notification of issues computes QoE (Quality of Experience). For example, program 121 for notification of issues uses the E-Model for audio and the Opinion-Model for video, which are standardized by ITU-T (Telecommunication Standardization Sector of the International Telecommunications Union).

Referring to FIG. 2A, program 121 for notification of issues determines, at decision block 205, whether the QoE is below a predetermined level for a predetermined time period. In response to determining that the QoE is not below the predetermined level for the predetermined time period ("NO" branch of decision block 205), program 121 for notification of issues reiterates step 201. In response to determining that the QoE is below the predetermined level for the predetermined time period ("YES" branch of decision block 205), program 121 for notification of issues, at step 207, reports a QoE issue to server 110 (shown in FIG. 1) that provides the network service.

Referring to FIG. 2A, at step 209, on server 110, program 111 (shown in FIG. 1) for handling issues sends an acknowledgement to end user device 120, in response to receiving the QoE issue notification. At step 211, program 111 for handling issues checks the issue. At decision block 213, program 111 for handling issues determines whether the issue is listed to be resolved by server 110. In response to determining that the issue is listed to be resolved by server 110 ("YES" branch of decision block 213), program 111 for handling issues resolves the issue, at step 215. Then, program 111 for handling issues, at step 217, requests an affirmation from end user device 120 which confirms the resolution of the issue. At step 219, program 111 for handling issues receives from end user device 120 the affirmation.

Referring to FIG. 2A, "NO" branch of decision block 213 leads to step 221 on FIG. 2B. Now, referring to FIG. 2B, in response to determining that the issue is not listed to be resolved by server 110 ("NO" branch of decision block 213), program 111 for handling issues, at step 221, forwards the issue to system administrator 130 (shown in FIG. 1). In response to receiving the issue forwarded from server 110, at step 223, system administrator 130 assesses a risk level of the issue. At step 225, system administrator 130 classifies the issue to a level of priority. The priority level, for example, may be "urgent", "moderate", or "to-do". At decision block 227, system administrator 130 determines whether there is a solution for the issue.

In response to determining that there is a solution for the issue ("YES" branch of decision block 227), at step 229, system administrator 130 resolves the issue according to the level of priority. At step 231, system administrator 130 requests an affirmation from server 110. At step 233, on server 110, program 111 for handling issues requests, at step 233, requests an affirmation from end user device 120. At step 235, program 111 for handling issues receives the affirmation from end user device 120; the affirmation is sent by program 121 for notification of issues on end user device 120. At step 237, program 111 for handling issues sends to system administrator 130 the affirmation from end user device 120.

In response to determining that there is no solution for the issue ("NO" branch of decision block 227), at step 239, system administrator 130 develops a solution for the issue. The solution may include a human interaction and a door-to-door service.

Figure 3:
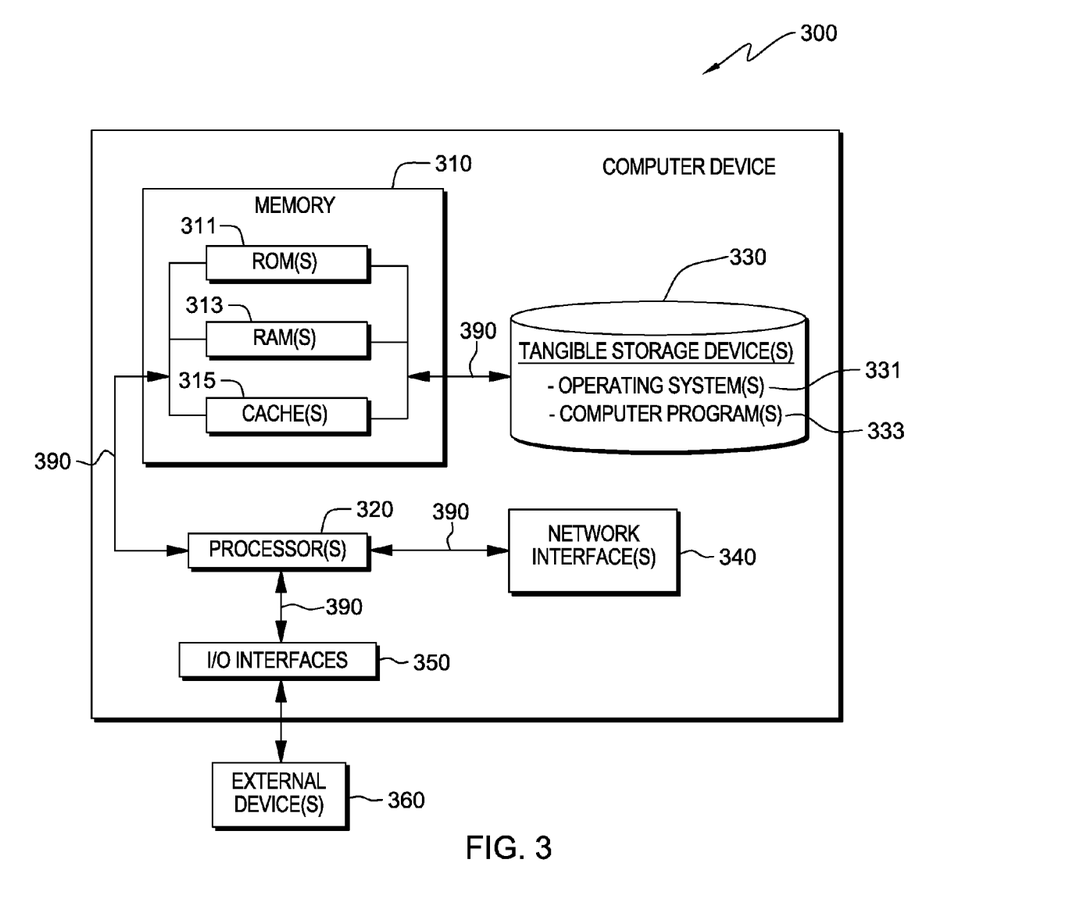
FIG. 3 is a diagram illustrating components of a computing device hosting an end user device or a server shown in FIG. 1, in accordance with one embodiment of the present invention.

FIG. 3 is a diagram illustrating components of computing device 300 hosting end user device 120 or server 110 shown in FIG. 1, in accordance with one embodiment of the present invention. It should be appreciated that FIG. 3 provides only an illustration of one implementation and does not imply any limitations with regard to the environment in which different embodiments may be implemented. In other embodiments, program 121 for notification of issues and network statistics 122 (both shown in FIG. 1) may reside respectively on computing devices. In yet other embodiments, program 111 for handling issues (shown in FIG. 1) may hosted by multiple computer devices which are connected by a network.

Referring to FIG. 3, computing device 300 includes processor(s) 320, memory 310, tangible storage device(s) 330, network interface(s) 340, and I/O (input/output) interface(s) 350. In FIG. 3, communications among the above-mentioned components of computing device 300 are denoted by numeral 390. Memory 310 includes ROM(s) (Read Only Memory) 311, RAM(s) (Random Access Memory) 313, and cache(s) 315.

One or more operating systems 331 and one or more computer programs 333 reside on one or more computer-readable tangible storage device(s) 330. In the embodiment shown on FIG. 1, on a computing device hosting end user device 120, program 121 for notification of issues and network statistics 122 reside on one or more computer-readable tangible storage device(s) 330. On a computing device hosting server 110, program 111 for handling issues reside on one or more computer-readable tangible storage device(s) 330.

Computing device 300 further includes I/O interface(s) 350. I/O interface(s) 350 allow for input and output of data with external device(s) 360 that may be connected to computing device 300. Computing device 300 further includes network interface(s) 340 for communications between computing device 300 and a computer network.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Any combination of one or more computer readable medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. The term of "computer readable storage medium" or "one or more computer-readable tangible storage devices", as used in this document, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Program code embodied on a computer readable medium may be transmitted using any appropriate medium including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture, including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for notification of a QoE (Quality of Experience) issue in a network service, comprising:
   gathering, by an end user device, statistics of the network service;
   computing, by the end user device, QoE metrics based on the statistics of the network service;
   determining, by the end user device, whether the QoE metrics is below a predetermined level for a predetermined time period;
   sending, by the end user device, the notification of the QoE issue to a server providing the network service, in response to determining that the QoE metrics is below the predetermined level for the predetermined time period;
   determining, by the server, whether the QoE issue is listed to be resolved by the server, in response to receiving the notification of the QoE issue;
   resolving, by the server, the QoE issue, in response to determining that the QoE issue is listed to be resolved by the server; and
   forwarding, by the server, the notification of the QoE issue to a system administrator, in response to determining that the QoE issue is not listed to be resolved by the server.

2. The computer-implemented method of claim 1, further comprising: sending, by the server, to the end user device an acknowledgement of receiving the notification.

3. The computer-implemented method of claim 1, further comprising:
   sending, by the server, to the end user device a request for an affirmation of the end user device; and
   receiving, by the server, from the end user device the affirmation.

4. The computer-implemented method of claim 1, further comprising:
   receiving, by the server, from the system administrator a request for an affirmation of the server; and
   sending, by the server, to the system administrator the affirmation.

5. The computer-implemented method of claim 1, further comprising:
   receiving, by the end user device, from the server a request for an affirmation of the end user device; and
   sending, by the end user device, to the server the affirmation.

6. The computer-implemented method of claim 1, wherein the end user device is a computer device, a device receiving audio and/or video signals, or a set-top box.

7. A computer program product for notification of a QoE (Quality of Experience) issue in a network service, the computer program product comprising a non-transitory computer readable storage medium having program code embodied therewith, the program code executable to:
   gather, by an end user device, statistics of the network service;
   compute, by the end user device, QoE metrics based on the statistics of the network service;
   determine, by the end user device, whether the QoE metrics is below a predetermined level for a predetermined time period;
   send, by the end user device, the notification of the QoE issue to a server providing the network service, in response to determining that the QoE metrics is below the predetermined level for the predetermined time period;
   determine, by the server, whether the QoE issue is listed to be resolved by the server, in response to receiving the notification of the QoE issue;
   resolve, by the server, the QoE issue, in response to determining that the QoE issue is listed to be resolved by the server; and
   forward, by the server, the notification of the QoE issue to a system administrator, in response to determining that the QoE issue is not listed to be resolved by the server.

8. The computer program product of claim 7, further comprising the program code executable to: send, by the server, to the end user device an acknowledgement of receiving the notification.

9. The computer program product of claim 7, further comprising the program code executable to:
   send, by the server, to the end user device a request for an affirmation of the end user device; and
   receive, by the server, from the end user device the affirmation.

10. The computer program product of claim 7, further comprising the program code executable to:
    receive, by the server, from the system administrator a request for an affirmation of the server; and
    send, by the server, to the system administrator the affirmation.

11. The computer program product of claim 7, further comprising the program code executable to:
    receive, by the end user device, from the server a request for an affirmation of the end user device; and
    send, by the end user device, to the server the affirmation.

12. The computer program product of claim 7, wherein the end user device is a computer device, a device receiving audio and/or video signals, or a set-top box.

13. A computer system for notification of a QoE (Quality of Experience) issue in a network service, the computer system comprising:
    one or more processors, one or more computer-readable tangible storage devices, and program instructions stored on at least one of the one or more computer-readable tangible storage devices for execution by at least one of the one or more processors, the program instructions executable to:
    gather, by an end user device, statistics of the network service;
    compute, by the end user device, QoE metrics based on the statistics of the network service;
    determine, by the end user device, whether the QoE metrics is below a predetermined level for a predetermined time period;
    send, by the end user device, the notification of the QoE issue to a server providing the network service, in response to determining that the QoE metrics is below the predetermined level for the predetermined time period;
    determine, by the server, whether the QoE issue is listed to be resolved by the server, in response to receiving the notification of the QoE issue;

resolve, by the server, the QoE issue, in response to determining that the QoE issue is listed to be resolved by the server; and forward, by the server, the notification of the QoE issue to a system administrator, in response to determining that the QoE issue is not listed to be resolved by the server.

14. The computer system of claim 13, further comprising the program instructions executable to: send, by the server, to the end user device an acknowledgement of receiving the notification.

15. The computer system of claim 13, further comprising the program instructions executable to:

send, by the server, to the end user device a request for an affirmation of the end user device; and receive, by the server, from the end user device the affirmation.

16. The computer system of claim 13, further comprising the program instructions executable to:

receive, by the server, from the system administrator a request for an affirmation of the server; and send, by the server, to the system administrator the affirmation.

17. The computer system of claim 13, further comprising the program instructions executable to:

receive, by the end user device, from the server a request for an affirmation of the end user device; and send, by the end user device, to the server the affirmation.

18. The computer system of claim 13, wherein the end user device is a computer device, a device receiving audio and/or video signals, or a set-top box.

* * * * *